May 12, 1959    K. J. CHICHESTER    2,886,666

GOVERNOR FOR SMALL MOTORS

Filed July 16, 1958

*INVENTOR.*
KENNETH J. CHICHESTER
BY
Ervin B. Steinberg
AGENT.

United States Patent Office 2,886,666
Patented May 12, 1959

2,886,666

GOVERNOR FOR SMALL MOTORS

Kenneth J. Chichester, Stamford, Conn., assignor to The Reflectone Corporation, Stamford, Conn., a corporation of Connecticut Application July 16, 1958, Serial No. 748,836

7 Claims. (Cl. 200—80)

This invention generally has reference to a governor for motors and more particularly, refers to a speed governor for very small motors, for instance permanent magnet motors as used in battery operated office machines, portable dictating machines, battery operated missile control systems and in many other and similar applications.

Governors of the type indicated must satisfy many requirements which are more or less unique. For instance, these small direct current motors operate at speeds of many thousand r.p.m., so that the governors are required to be dynamically well balanced and to withstand high speed operation. In view of the small size of these motors, the governor must be compact, occupy a minimum amount of space, yet be completely reliable. Moreover, a governor in this type of application is required to operate without maintenance, must comprise a minimum number of individual parts yet be inexpensive to manufacture. Last but not least, the efficiency of the motor to a great extent depends upon the losses within the governor construction. Since most of the motors are battery-operated, the efficiency, or current drain, assumes major importance. The governor therefore, should be designed for a minimum amount of loss, particularly friction loss as caused by the brush contacts which establish connection to the rotating governor assembly. Since the brush pressure is dictated by electrical considerations, the major improvement can be made by designing the governor in such a manner that the brushes engage the governor construction as near to the center of rotation as possible. In this way, the torque loss (contact pressure times radial distance) may be kept to a minimum.

One of the objects of this invention therefore is the provision of a new and improved governor which avoids one or more of the disadvantages of prior art devices.

Another object of this invention is the provision of a governor which is adapted to operate at high speed and is useful for operation with small motors.

Another object of this invention is the provision of a governor design which is characterized by a minimum number of parts and which will remain stable during its useful life.

Another object of this invention is the provision of a governor for small D.-C. motors which employs a pair of interrupting contacts in order to improve reliability and lengthen its useful life.

Another object of this invention is the provision of a speed governor for D.-C. motors which shows a minimum amount of loss caused by frictional drag of contact brushes engaging the governor.

Another object of this invention is a governor design which is compact in its configuration and therefore requires a minimum amount of space.

Further and other objects of this invention will become apparent by reference to the following specification taken in conjunction with the accompanying drawings in which.

Figure 1:
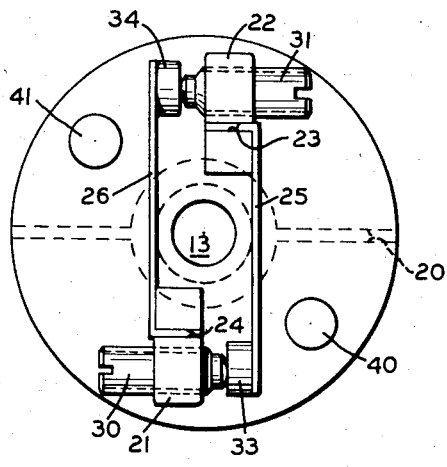
Figure 1 is a plan view showing the contact arrangement of the governor.
Figure 2:
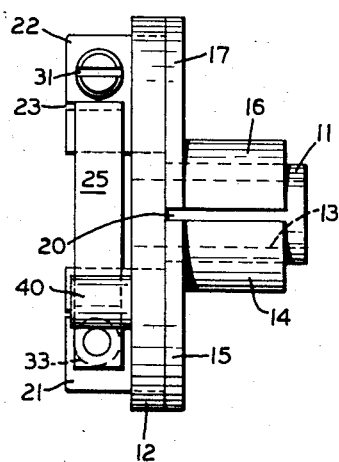
Figure 2 is a side elevational view of the governor.
Figure 3:
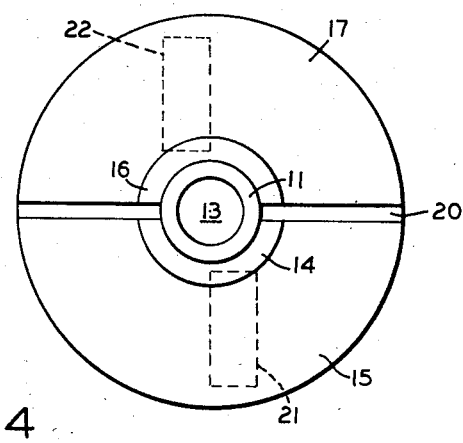
Figure 3 is a plan view at the underside of the governor.

Referring now to Figures 1, 2, and 3, numeral 11 identifies an annular bushing, which together with plate 12 forms a unitary flange made of insulating material, for instance nylon, or other suitable plastic composition. This flange construction usually is mounted on a rotatable shaft by means of aperture 13 which extends through the flange.

Onto this flange, made of insulating material, there is mounted a split flange made of metallic material, for instance brass, which includes a first flange halve comprising a half bushing 14 and plate 15, and a second flange halve comprising half bushing 16 and plate 17. Both metallic flange halves are separated by a slot 20 in order to effect electrical isolation between the two parts. It will be understood however, that both metal portions and the portions made of plastic material form a unitary molding.

Projecting from metal plate 15 and through insulating plate 12 there is an upstanding metal block 21 which forms a part of plate 15. Similarly, upstanding block 22 forms a part of metal plate 17 and also projects through plate 12. Each of these blocks is equipped with a transverse slot 23 and 24 respectively in which there is retained an L shaped, leaf type contact spring 25 and 26 respectively. This type of mounting is commonly known as "cantilever" type. The leaf contact springs are resilient, made for instance of beryllium-copper alloy or of "Ni-Span" made by the H. A. Wilson Co. of Union, New Jersey. This latter metal has the desirable characteristics that its modulus of elasticity is substantially constant for the normal operating temperature range from −50 to +150° F. thereby obtaining stability of operation over a wide temperature range. The contact springs may be secured in the slot by staking.

A screw 30 and 31 respectively protrudes through each of the blocks to engage the free end of one of the contact leaf springs, the free end of each spring being equipped with suitable contact material 33 and 34 respectively. The contact material, for example, may be a platinum-iridium alloy and similarly, the tip of screws 30 and 31 may be made of the same alloy.

When the entire assembly is mounted on a shaft and rotated, leaf springs 25 and 26, by action of centrifugal force, are urged outwardly so as to break contact with the associated screw contact. Outward motion of the springs is limited by upstanding bosses 40 and 41 respectively which form an integral part with plate 12 and are of insulating material.

Figure 4:
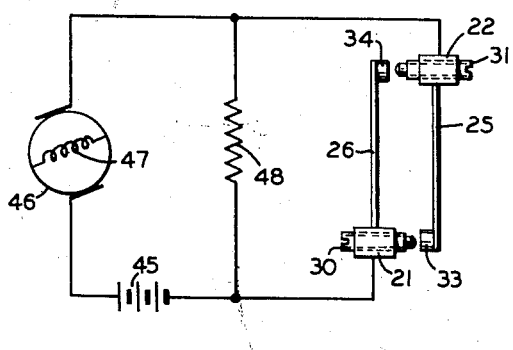
Figure 4 is a schematic circuit diagram showing the electrical connections of the governor in conjunction with the motor to which the governor is attached.

Operation of the governor may be visualized as follows:

The governor is mounted on the rotor shaft of a direct current motor and connected in series with the supply voltage. Electrical circuit connection to the governor construction is accomplished by means of a set of diametrically opposed, stationary contact brushes, one brush engaging half bushing 14 and the other brush engaging bushing 16. As explained previously, bushing 14 is in electrical contact with block 21 and bushing 16 in contact with block 22. Figure 4 illustrates the circuit and shows a source of direct current 45 serially connected to motor 46. Numeral 47 represents the rotor winding of the motor. When contact screw 31 engages contact spring 26 or contact 30 engages spring 25, the circuit is closed and the motor will receive power. As soon as preadjusted speed is reached, centrifugal force will urge springs 25 and 26 away from engagement with the respective contact screws, thus interrupting the circuit from the power source, causing the motor to slow down, until contact is reestablished. This cycle of events is repeated over and over again.

It will be observed that two sets of contact springs and corresponding contact screws are used whereas a single circuit breaking arrangement would suffice. The provision of double contacts increases the life of the governor and furthermore, assures operation in the event of failure of one of the contacts. In this manner, reliability of operation of the motor is greatly improved and chances of failure due governor fault reduced. A high impedance resistor 48, connected across the governor assembly, may be used to provide arc suppression for the governor contacts. Similarly, a capacitor quenching circuit could be used.

In designing the leaf springs, proper care must be taken that the oscillation of the springs is high enough so that a substantially constant motor speed is obtained. If the contact opens and closes relatively slowly, the deviation in speed from the desired r.p.m. setting becomes great whereas many oscillations or circuit interruptions, each but for a brief period of time, will maintain the motor within a few r.p.m. at the set speed, let us say 3,000 r.p.m.

By using the following formulas for the cantilever type mounted springs, the frequency of contact opening and closing may be calculated within close limits:

$T = \sqrt{d/g}$ wherein $T = 1/f$ and $f$ = Frequency in cycles per second
$d$ = linear deflection of spring contact at tip away from screw as caused by centrifugal force
$g$ = gravitational constant and $d = FL^3/3EI$ wherein $F$ = force
$L$ = length of spring
$E$ = modulus of elasticity
$I$ = bending moment of inertia As an example, satisfactory results will be obtained by dimensioning the spring contact for a frequency of 200 cycles per second.

In order to set the governor for the desired speed the following procedure may be employed. First, a piece of paper is inserted between one set of contacts in order to remove it from the circuit. The motor then is energized and the adjustable contact adjusted until proper speed is obtained. Next, the motor is stopped, a piece of paper is inserted between the adjusted pair of contacts and the procedure repeated for the other set of contacts. In this manner, both sets of contacts are set for the same speed. Suitable means may be employed to secure the adjustable contacts in their position.

The governor construction described herein by virtue of its balanced design is well adapted to operate at a speed of many thousand r.p.m. Bushings 14 and 16 provide contact surfaces for the brushes and are disposed as near to the center of rotation as possible to reduce torque losses to a very minimum. Moreover, it will be observed that the instant construction is characterized by a minimum of individual parts, thus providing utmost reliability and stability during operation.

In this manner it has been possible to provide a governor whose overall dimensions are ¾ inch diameter by 7/16 inch wide which may be used in conjunction with a motor design disclosed in my copending application for U.S. Letters Patent, Serial No. 725,620, filed April 1, 1958 entitled "Permanent Magnet Electric Motor."

While there has been described and illustrated a certain specific design for a governor, it will be apparent to those skilled in the art that various changes and modifications may be made therein without deviating from the principle and intent of the present invention, which shall be limited only by the scope of the appended claims.

What is claimed is:

1. A speed governor for motors of the type described comprising: a supporting plate having a center of rotation; a pair of mounting blocks disposed substantially diametrically opposite one another on said supporting plate; a pair of contact leaf springs, each spring associated with one of said mounting blocks and being fastened at one end to said mounting blocks; an adjustable contact means disposed in each of said mounting blocks and protruding therefrom to engage the free end of one of said contact leaf springs, and centrifugal force caused by rotation of said supporting plate about said center of rotation urging the free ends of said leaf springs to move away from the associated adjustable contact.

2. A speed governor for motors of the type described comprising: a pair of contact leaf springs disposed substantially parallel to one another; plate means for mounting said springs for rotation in unison about a central axis of rotation and said axis being straddled by said springs; said springs being supported in a cantilever fashion on said plate means whereby the free end of one spring is juxtaposed with the supported end of the other spring; a pair of adjustable contact means, each contact means adapted to engage the free end of one of said leaf springs, and centrifugal force caused by rotation of said plate means about said central axis urging the free end of each leaf spring away from engagement with the associated adjustable contact.

3. A speed governor for motors of the type described comprising: a unitary rotatable molding which includes an electrically insulated disk and a pair of substantially semi-circular metallic plates insulated from one another fastened to one side of said disk; a pair of mounting blocks, one associated with each of said plates, extending from the associated plate through the disk and forming raised portions on said disk; said raised portions being located substantially diametrically opposite one another near the periphery of said disk; a pair of contact leaf springs, each cantilever like supported in one of said blocks and extending with the free end in a general direction toward the other block whereby both of said leaf springs are disposed substantially parallel to one another; an adjustable contact disposed in each of said blocks and adapted to engage the free end of said contact leaf spring extending thereto, and centrifugal force caused by rotation of said molding urging each of said leaf springs away from engagement with the associated adjustable contact.

4. A speed governor for motors of the type described comprising: a unitary rotatable molding which includes an electrically insulated disk and a pair of substantially semi-circular metallic plates insulated from one another fastened to one side of said disk; a pair of mounting blocks, one associated with each of said plates, extending from the associated plate through the disk and forming raised portions on said disk; said raised portions being located substantially diametrically opposite one another near the periphery of said disk; each of said blocks having a transverse slot; a pair of L-shaped contact leaf springs, each retainingly supported in the slot of one of said blocks and extending with the free end in a general direction toward the other block whereby both of said leaf springs are disposed substantially parallel to one another; an adjustable contact screw disposed in each of said blocks and adapted to engage the free end of said contact leaf spring extending thereto, and centrifugal force caused by rotation of said molding urging each of said leaf springs away from engagement with the associated adjustable contact.

5. A speed governor for motors of the type described comprising: a unitary rotatable molding in the form of a flange which includes an electrically insulated disk, a centrally located bushing extending therefrom, a pair of substantially semi-circular metallic plates insulated from one another fastened to one side of said disk, and a split metallic bushing disposed about said former bushing; a pair of mounting blocks, one associated with each of said plates, extending from the associated plate through the disk and forming raised portions on said disk; said raised portions being located substantially diametrically opposite one another near the periphery of said disk; each of said blocks having a transverse slot; a pair of L-shaped contact leaf springs, each retainingly supported in the slot of one of said blocks and extending with the free end in a general direction toward the other block whereby both of said leaf springs are disposed substantially parallel to one another; an adjustable contact screw disposed in each of said blocks and adapted to engage the free end of said contact leaf spring extending thereto; a set of stops, centrifugal force caused by rotation of said molding urging each of said leaf springs away from engagement with the associated adjustable contact toward said stops, and said metallic bushing adapted to be engaged by a set of contact brushes.

6. A speed governor for motors of the type described comprising: a supporting plate having a center of rotation; a pair of mounting blocks disposed substantially diametrically opposite one another on said supporting plate; a pair of contact leaf springs, each spring associated with one of said mounting blocks and being fastened at one end to the associated mounting block; an adjustable contact means disposed in each of said mounting blocks and protruding therefrom to engage the free end of one of said contact leaf springs; centrifugal force caused by rotation of said supporting plate about said center of rotation urging the free ends of said leaf springs to move away from the associated adjustable contact, and said leaf springs having a substantially constant modulus of elasticity for the temperature range between minus 50 and plus 150 degrees F.

7. A speed governor for motors of the type described comprising: a rotative element; a pair of mounting blocks disposed substantially diametrically opposite one another on said element; a pair of contact leaf springs, each spring fastened at one end to an associated block; the other end of each spring being free and extending toward the opposite block; adjustable contact means disposed between each of said mounting blocks and the free end of the respective leaf spring extending thereto to cause electrical contact therebetween when the rotative element is standing still, and rotation of said element causing centrifugal forces which urge separation between the blocks and respective free ends.

References Cited in the file of this patent
UNITED STATES PATENTS 2,846,541     Evans et al. _____ Aug. 5, 1958